Figure 4:
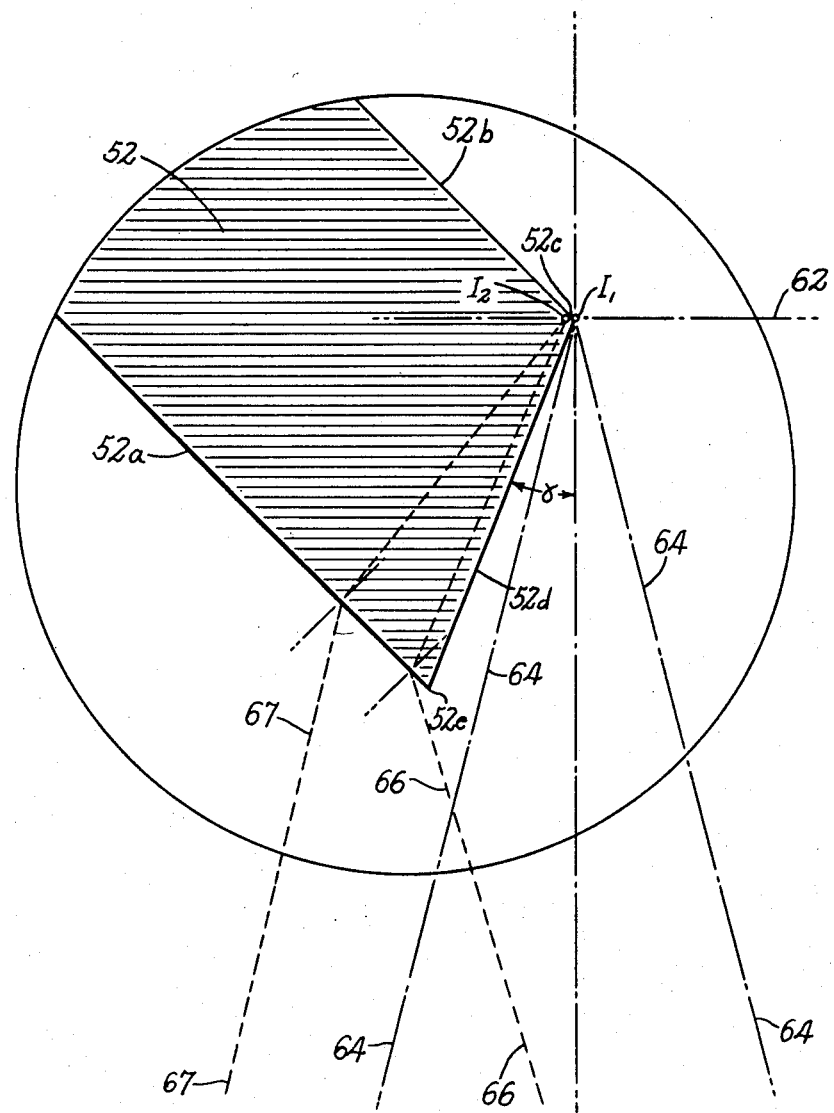

April 7, 1959   C. J. KOESTER   2,880,648
HALF-SHADE DEVICES FOR USE WITH POLARIZING INSTRUMENTS
Filed Dec. 31, 1957   4 Sheets-Sheet 1
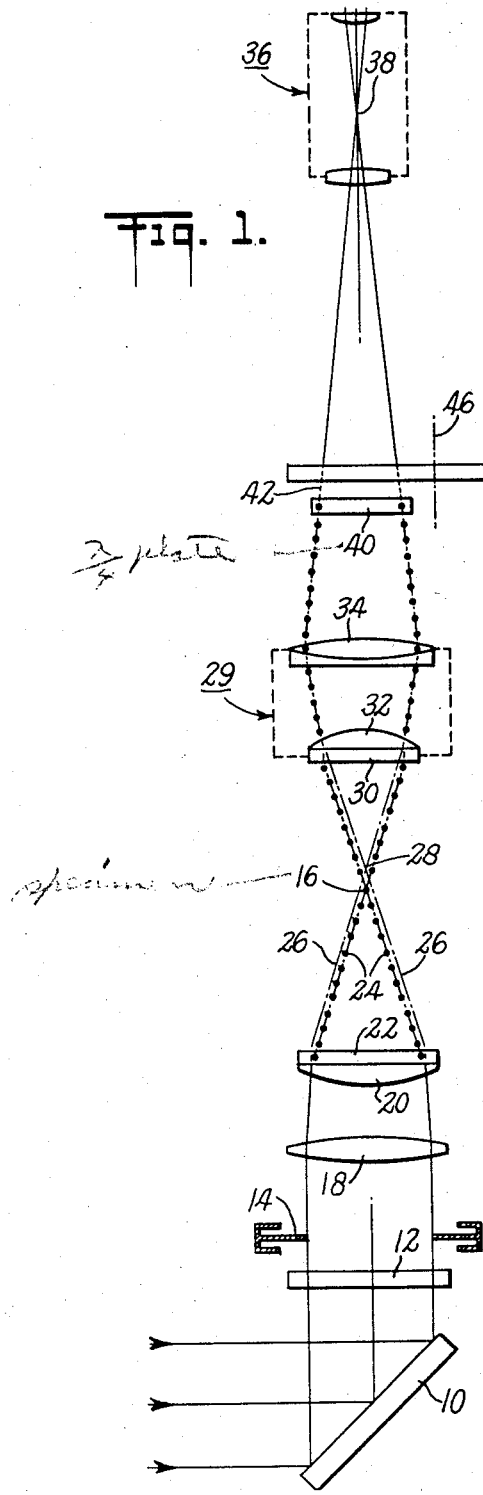
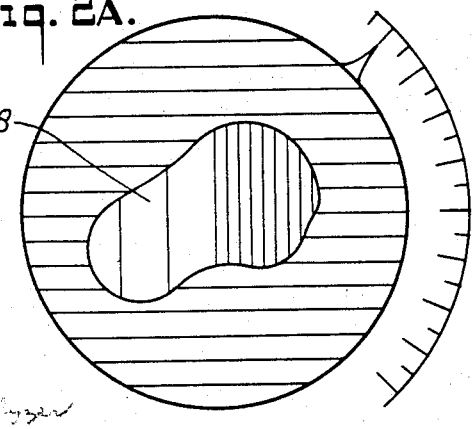
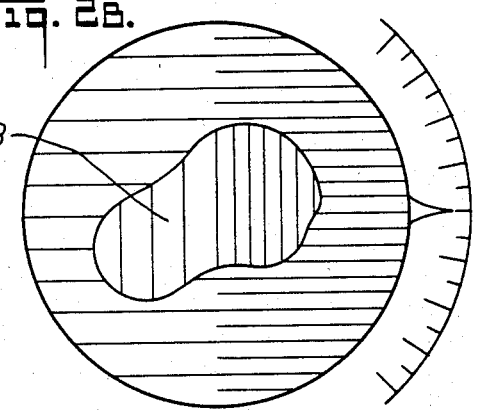
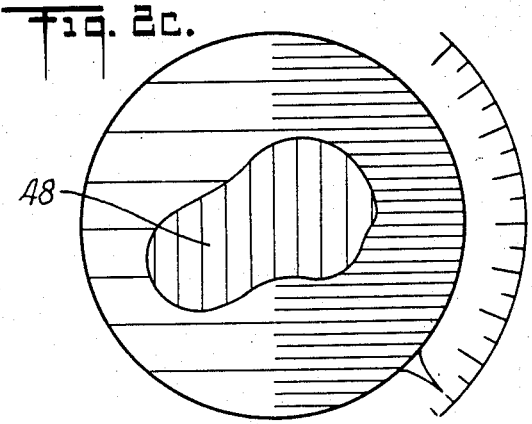
INVENTOR.
Charles J. Koester
BY
Blair + Spencer
ATTORNEYS Light is "" both faces 52b & 52d "" prevent the edge at which the faces are joined from showing a sharp line of demarcation.
April 7, 1959   C. J. KOESTER   2,880,648
HALF-SHADE DEVICES FOR USE WITH POLARIZING INSTRUMENTS
Filed Dec. 31, 1957   4 Sheets-Sheet 2
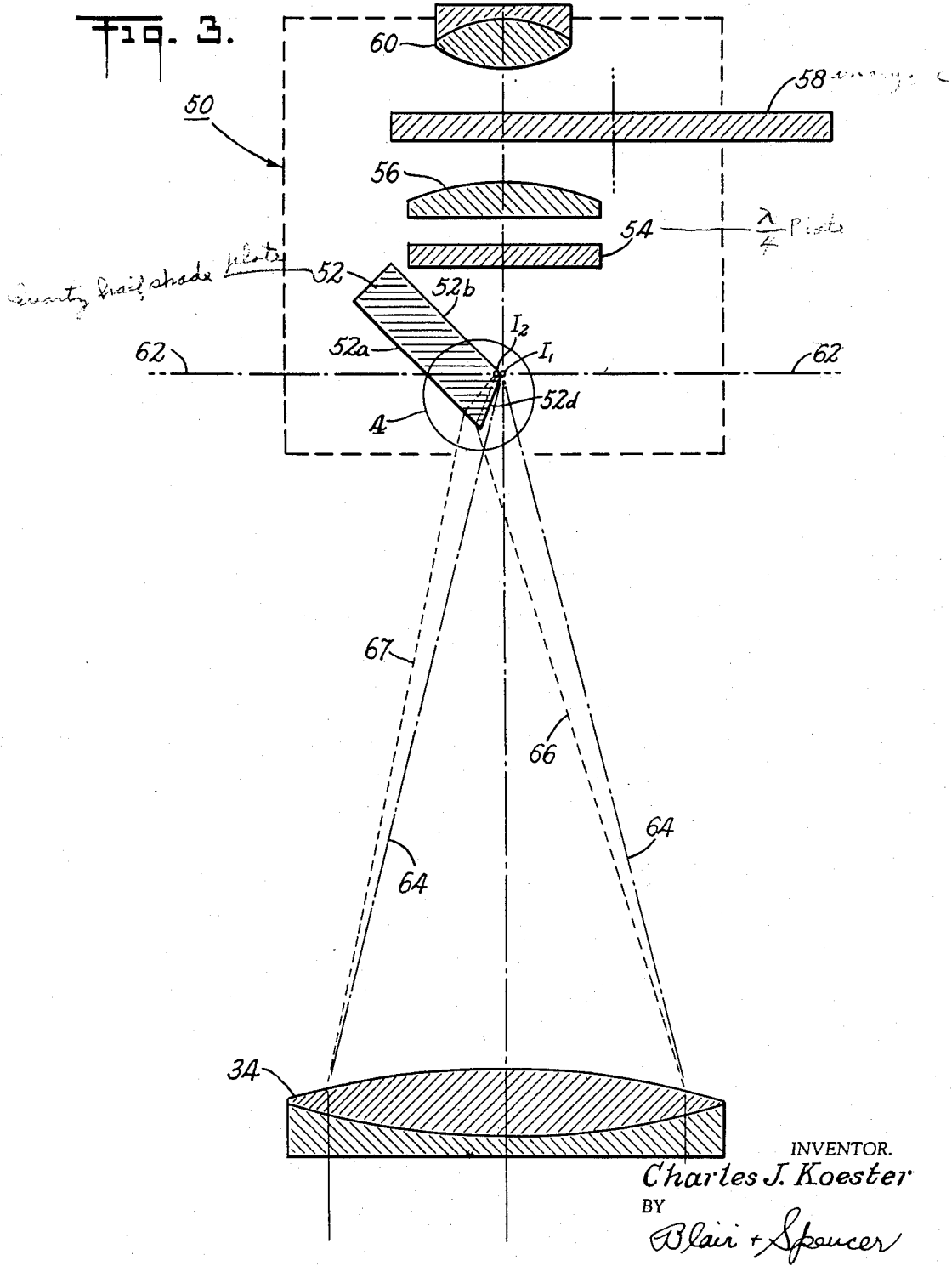
INVENTOR.
*Charles J. Koester*
BY
*Blair + Spencer*
ATTORNEYS April 7, 1959   C. J. KOESTER   2,880,648
HALF-SHADE DEVICES FOR USE WITH POLARIZING INSTRUMENTS
Filed Dec. 31, 1957   4 Sheets-Sheet 3

INVENTOR.
Charles J. Koester
BY
Blair & Spencer
ATTORNEYS

April 7, 1959 C. J. KOESTER 2,880,648
HALF-SHADE DEVICES FOR USE WITH POLARIZING INSTRUMENTS
Filed Dec. 31, 1957 4 Sheets-Sheet 4

INVENTOR.
Charles J. Koester
BY
Blair + Spencer
ATTORNEYS

United States Patent Office 2,880,648
Patented Apr. 7, 1959

2,880,648

HALF-SHADE DEVICES FOR USE WITH POLARIZING INSTRUMENTS

Charles J. Koester, Southbridge, Mass., assignor to American Optical Company, Southbridge, Mass., a voluntary association of Massachusetts Application December 31, 1957, Serial No. 706,341

15 Claims. (Cl. 88—39)

My invention relates to an improved half-shade device for optical instruments utilizing polarized light. More specifically, it relates to an eyepiece utilizing a device of the type described in which the line of separation between the shaded and the unshaded portions of the visual field which are to be compared is extremely fine, so that when they are of the same intensity, the entire field appears to be substantially uniformly illuminated. My invention also relates to a half-shade eyepiece in which the half-shade angle is optimum, or nearly so, for the extinction ratio of the instrument or class of instruments with which it is to be used.

In general, my invention principally relates to the adaptation of interferometry to the field of microscopy. In interference microscopes of the type to which the invention may be applied, two optical beams of coherent illumination, from a single light source, are divided so that the light of one beam is focused on and passes through a transparent microscopic specimen (most frequently a biological specimen), while the other beam is focused at the plane of the surrounding media or solution in which the specimen is suspended. After passing separately through the specimen and its surrounding area, the two beams are reunited, whereupon the light waves of the combined beams interfere with each other to produce measurable patterns from which an observer can determine the differences in length of path traversed by the two beams. Additionally, when either the thickness of the specimen or the refractive index difference between specimen and surround is known, the other may be readily determined. The initial separation of the unitary light source into two beams may be accomplished by a birefringent element such as quartz or calcite, and the beams may be reunited by the objective lens system of the microscope. Measurement of the interference pattern formed by the combined beams is accomplished by rotating a polarizing element which is incorporated in the eyepiece system of the microscope.

The problems to which the invention is particularly directed are those of obtaining greater accuracy in the visual interpretation of interference patterns, and more accurately determining angular rotation of polarized light beams. The manner in which these problems are solved by the invention will become more apparent from the detailed description which follows.

Figure 5:
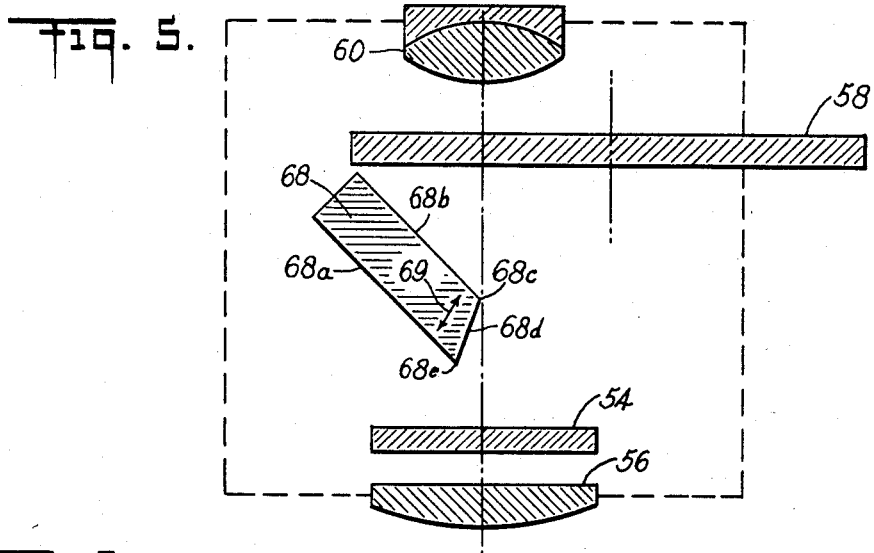
Figure 6A:
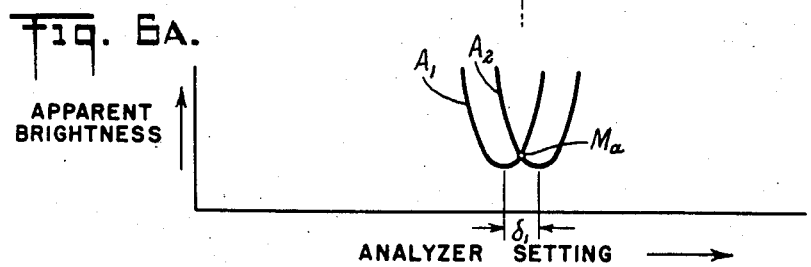
Figure 6B:
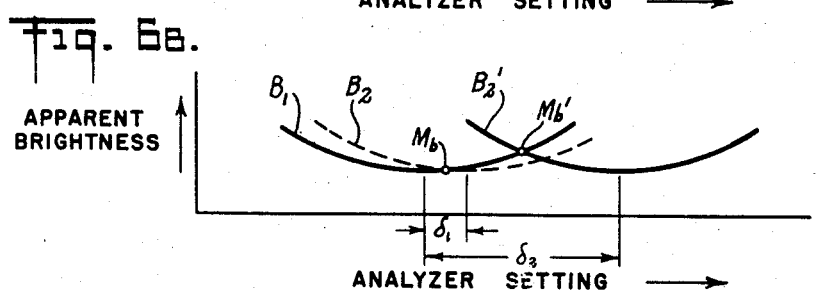
Figure 7:
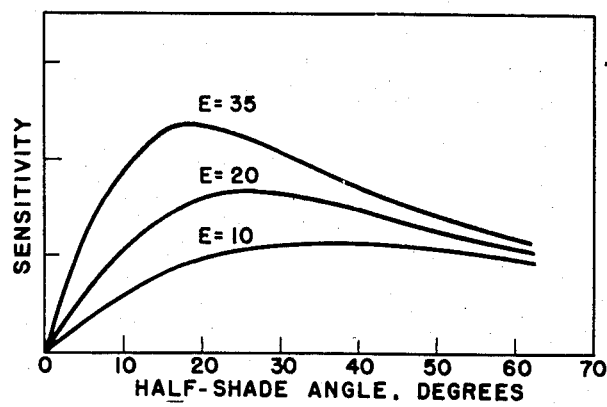

For a better understanding of my invention, reference should be had to the following description taken in connection with the accompanying drawings in which:

Figure 1 is a schematic optical diagram of an interference microscope utilizing polarized light of the type with which the eyepiece of my invention might be used, Figure 2a is a diagram illustrating the appearance of the field of view obtained with half-shade eyepieces when used with a microscope of the type shown in Figure 1 when the two portions of the background, or surround, but not the specimen, are matched in intensity, Figure 2b is a diagram similar to Figure 2a but in which the analyzer of the microscope is turned to a position where neither the two portions of the background nor the two portions of the specimen are matched in intensity, Figure 2c is a diagram similar to Figure 2b but in which the analyzer of the microscope is turned to a position where the two halves of the specimen are matched while the two halves of the background are not, Figure 3 is an optical sectional diagram taken along the optical axis of one embodiment of the eyepiece of my invention, Figure 4 is an enlarged view of the portion enclosed within the circle 4 of Figure 3, Figure 5 is an optical sectional diagram taken along the optical axis of a second embodiment of the eyepiece of my invention, Figure 6a is a plot of apparent brightness of the two portions of the field in an instrument having a half-shade eyepiece as a function of analyzer position, the instrument having a relatively high extinction ratio, Figure 6b is a plot, similar to Figure 6a, in which the instrument has a low extinction ratio, and Figure 7 is a family of curves showing the variation in sensitivity of the analyzer setting in an instrument using polarized light plotted as a function of the half-shade angle for various extinction ratios.

As previously mentioned, the improved half-shade eyepiece of my invention is designed for use with optical instruments utilizing polarized light. As example of a typical instrument of this sort, an interference microscope, is illustrated in Figure 1.

As shown therein, the microscope includes a mirror 10 which reflects light from a source (not illustrated), preferably monochromatic, upwardly through the optical system of the microscope. A polarizer 12 plane polarizes the light passing upwardly from mirror 10 at some single azimuth. The amount of light passing through the microscope is regulated by iris diaphragm 14 and is focused on the specimen 16 by the condenser formed by lenses 18 and 20. A birefringent plate 22 separates the polarized light passing through the condenser into two beams, the azimuth of the polarized light being set at 45° to the axis of the birefringent plate by the polarizer 12. These two beams, indicated respectively by the dotted lines 24 and the dash-dot lines 26 in Figure 1, are plane polarized at right angles to each other. The rays forming beam 24 focus on the specimen which is located at 16, while the rays forming beam 26 spread around the specimen to focus above it at 28. The phase of the beam 24 focused at the specimen is changed with respect to the phase of beam 26 which is focused above the specimen in passing from the condenser to the microscope objective generally indicated at 29. This phase change is caused by local variations in optical thickness in each portion of the specimen, while any phase change in the reference beam 26 depends on the average optical thickness of the specimen and the region surrounding it.

In another type of interference microscope utilizing the so-called "shearing system" as disclosed in U.S. Patent No. 2,601,172 issued July 17, 1952, to F. H. Smith, the reference beam 26 is focused to one side of, but in the same plane as, the object beam 24. The eyepieces of my invention, to be described more fully hereinafter, are equally useful with either system.

A birefringent plate 30 placed in front of objective lenses 32 and 34 reunites the two perpendicularly polarized beams 24 and 26 into a single beam so that they may pass through the remainder of the optical system together. As is well known, two beams will not interfere when they are mutually perpendicular. The objective formed by lenses 32 and 34 focuses the combined light beams within the eyepiece generally indicated at 36 at the point 38.

The quarter-wave plate 40, with its optic axis parallel to the azimuth of the polarizer 12, changes each of the plane polarized beams to circularly polarized light, one into left-handed circularly polarized light and the other into right-handed circularly polarized light. These two beams then interfere to produce a single plane polarized light beam 42 whose direction of polarization depends on the phase difference between the original mutually perpendicular components. Since the phase of the beam passing through the specimen is shifted in a different manner than the phase of the beam passing through the area surrounding it, the polarization of the plane polarized beam from the specimen will have a different direction of polarization than that from the surrounding background. By measuring this difference in direction, useful information regarding thickness and/or refractive index may be obtained.

The measurement of phase angle is accomplished by rotating the analyzer indicated at 44. The analyzer in general comprises a sheet of polarizing material that is transparent to light when it is positioned so that its direction or azimuth of polarization is parallel to the direction of polarization of the light falling thereon and which is opaque to light polarized at right angles to this azimuth. The analyzer is first rotated about the axis 46 until the background or "surround" around the specimen has minimum luminance. At this position the azimuth of the analyzer is at right angles to the azimuth of the beam falling thereon. This angle is noted on a scale attached to the analyzer. The analyzer is then rotated until the specimen shows minimum luminance, and the angle is again noted. The difference between these angles represents the difference in direction of polarization of the light from the specimen and from the surround. Since this difference in direction is dependent upon the phase difference between the two beams 24 and 26, it is a measure of the difference in the optical path length through the specimen and the surround.

This method of measurement has a major inherent inaccuracy. It is difficult and treacherous for the human eye to set a small part of the field, as for example the specimen, for minimum luminance when the background surrounding this small part of the field is simultaneously changing luminance. Some operators tend to set the position of the analyzer 44 for maximum contrast between the background and the specimen rather than the minimum of luminance. Also, in general, the human eye is not as sensitive in determining a position of minimum luminance as it is in determining a match in luminance between two different parts of a field. Accordingly, there have been developed for use with microscopes of the type shown in Figure 1 half-shade eyepieces of various types.

The general principles of operation of these half-shade eyepieces can be described by reference to Figures 2a, 2b, and 2c. Figure 2b represents the field of view through a microscope of the type illustrated in Figure 1 when it is provided with a half-shade eyepiece which introduces a fixed phase retardation of the light passing through a portion (in this case, one-half) of the field with respect to the other half of the field. It will be noted, as shown in Figure 2b, that the luminance of one-half of the surround is different from the other half of the surround, and the same is true of the specimen indicated at 48, i.e. each half of the specimen has a different luminance which is different in turn from the surround. However, when the analyzer is rotated to some setting, the two halves of background will be of equal intensity as indicated in Figure 2a. At this angle the azimuth of the analyzer is making equal angles with the light illuminating each half of the surround in the field. This angle is noted, and the analyzer is further rotated to a second position at which both halves of the specimen appear with equal luminance as in Figure 2c. The difference between the angle measured in Figure 2a and that measured in Figure 2c is therefore a measure of the difference in phase angle of the two perpendicularly polarized beams of light passing through the surround and through the specimen and therefore a measure of the difference in optical path length. In Figure 2c the azimuth of polarization of the analyzer is making equal angles with light passing through the specimen in both halves of the field. It is relatively easy for the human eye to recognize when a match is obtained as in Figures 2a and 2c, and therefore half-shade eyepieces for use with microscopes of this type have been found extremely useful and have also been found to give substantially increased accuracy of measurement.

One prior half-shade device used with polarizing instruments was the Soleil or Nakamura biplate. In this construction two flat pieces of quartz are cemented together at their edges and the plate thus formed is placed in the normal image plane of the instrument with the line of junction of the two pieces lying on or near the optical axis. One of the two flat pieces is a section of right-handed quartz, and the other a section of left-handed quartz, each of which had been cut perpendicular to the optic axis. Each of these two pieces rotates polarized light falling thereon, one portion in one direction and the other in the opposite direction, thus introducing a fixed difference in azimuth to produce a half-shade effect. However, when half-shade plates of this type are used in half-shade eyepieces, even with about 10× magnification, the edges must be very carefully polished to remove grinding chips and to allow the edges to come into intimate contact. Although this operation is carefully performed, the finite thickness of the plate causes some diffraction at the edges of the two plates, and the dividing line between the two halves of the field can be clearly seen.

It is important to note that a dividing line of appreciable width between the two halves of the field seriously degrades the accuracy of setting the analyzer. The analyzer can be set most accurately when the two halves of the field merge to a continuous uniform field when they are equally illuminated. If a line of appreciable width separates the two halves of the field, the operator must judge when the two halves are equally illuminated, and the wider the separation between them, the more difficult is this estimation.

Accordingly, attempts have been made in the past to produce a half-shade eyepiece in which this line of separation between the two halves of the field is minimized. In one structure of this type used with a microscope of the type described, a birefringent plate is inserted part way across the field with its optic axis parallel to the plane of polarization of the object beam. This plate is located in the optical system ahead of the quarter-wave plate, and thus it introduces a fixed phase retardation of one of the two perpendicularly polarized beams with respect to the other. However, a very evident line of separation appears between the two halves of the field of view. To eliminate this line, a rotating ground glass diffusing screen is located in the image plane, and the image is transferred to an eyepiece located a suitable distance above the image plane by a high speed ($f/3.5$) relay system. With this system the precision of setting achieved was above 1/700 wave lengths. While the structure described provides fair suppression of the dividing line and substantially increases the precision of setting, it requires a motor to drive the diffusing screen and a high speed relay system to transfer the image to the eyepiece. A complex and expensive system of this type is not desirable for general laboratory use.

Another type of half-shade device which has heretofore been used with instruments of the type described includes a prism having a totally reflective face, the face being located in the image plane of the instrument objective. A portion of the reflecting face is coated with a reflecting film of metal, usually aluminum. There is a difference in reflection from the metallized surface and the dielectric-air interface of the prism face. The two perpendicularly polarized beams are phase-shifted relative to each other by reflection from the metallized surface, and when they are later combined by the quarter-wave plate, the azimuth of polarization of the light reflected from the metallized face differs from that reflected from the other totally reflecting face. Although this device results in a fairly sharp line of division between the two portions of the field, it requires a fairly expensive prism and also does not permit the designer control of the half-shade angle, except by variation of materials. The half-shade angle, as used herein and in the claims, is the angle between the azimuths of the polarized beams in the two portions of the field after passing through the half-shade device. It is also the angle through which the analyzer must be turned to move from extinction in one portion of the field to extinction in the other portion. As will be discussed in more detail hereinafter, it is desirable to optimize this angle for the particular class of instruments with which the half-shade eyepiece is to be used.

A very simple yet effective device which has heretofore been used to provide a half-shaded field in saccharimeters using polarized light is the Lippich prism. In saccharimeters using this device, light is first passed through a polarizing prism or equivalent, and then a portion of it is passed through a Lippich prism. This prism is itself a polarizing device and changes the azimuth of polarization of the light passing therethrough as well as regulating the amount of light passed in one portion of the field. The two components of polarized light pass through the saccharimeter, and the rotation of the plane of polarization by the sugar solution therein is measured in the usual fashion.

The prism itself is so positioned, and the angles of the entrance and exit faces with respect to the surface adjacent the optical axis, as well as the angle of this surface with respect to the optical axis, are so chosen that a very fine dividing line is produced between the two portions of the field. However, a prism of this type cannot be used in an instrument utilizing interfering polarized light as in the instrument of Figure 1, since it shifts the entire plane of polarization, i.e. it is itself a polarizing component. Thus, if the prism were located as in the saccharimeter, immediately following the polarizer 12 in Figure 1, the polarized light striking the birefringent plate 22 would be polarized at two different azimuths. Since the azimuth of the polarized light striking plate 22 must be at 45° to its axis to obtain two equal components, only one portion of the field could be properly separated, and the other portion of the field would have two beams of unequal intensity. It would be undesirable to locate a Lippich prism in the eye-piece, since it is itself a polarizing device, and because of its relatively large size. The prism would have to be rotated with the analyzer to keep the change in polarization introduced by the prism at a constant value. Thus the line or lines separating the half-shaded portions of the field of view would rotate with the analyzer which is very undesirable. Thus the Lippich prism, which produces a relatively fine line of separation between the two portions of the field, is not suitable for half-shade devices for use with instruments of this type.

Another problem with prior half-shade eyepieces was that the half-shade angle was not optimized considering the extinction ratios of the instruments with which they were to be used. The half-shade angle is directly related to the shift in direction of polarization introduced by the half-shade devices previously described. The extinction ratio, as used herein and in the claims, is the ratio of maximum to minimum luminance in a given portion of the field. A theory for the prediction of the sensitivity of the analyzer measurement as a function of the half-shade angle has heretofore existed for instruments having perfect extinction, i.e. where the extinction ratio is infinite. However, in many modern optical instruments such as the interference microscope of Figure 1, where the polarized light passes through a large number of elements, some of which are birefringent plates, in converging beams, the extinction is not perfect. In the past the half-shade angle has been selected for these instruments in an empirical fashion, with no attempt to select the optimum half shade angle for the class of instruments with which the half-shade eyepiece was to be used. This manner of selection has resulted also in some loss of precision in measurement of optical path length.

Accordingly, it is a general object of my invention to provide an improved half-shade eyepiece for use with optical instruments using polarized light. Another object of my invention is to provide a half-shade eyepiece of the type described which minimizes the separation between the two portions of the field, thereby substantially increasing the precision of measurement. Another object of my invention is to provide a half-shade eyepiece of the type described which does not require external motors or complex and expensive optical systems. Still another object of my invention is to provide a half-shade eyepiece of the type described which does not result in appreciable light loss in the instrument. A further object of my invention is to provide a half-shade eyepiece of the type described which may be conveniently manufactured as a single simple assembly and which can be readily attached to the instrument with which it is to be used. Yet another object of my invention is to provide a half-shade eyepiece of the type described which permits control by the designer of the half-shade angle. A still further object of my invention is to provide a half-shade eyepiece of the type described which is simple and economical of manufacture and yet rugged in construction. A final stated object of my invention is to provide a half-shade eyepiece for optical instruments using polarized light in which the half-shade device rotates the plane of polarization in a portion of the field through substantially the optimum angle considering the extinction ratios of the class of instruments with which the device is to be used. Other and further objects of my invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of my invention, reference should be had to the following description.

In general, I have found that a plate of birefringent material, located in the optical path ahead of the quarter-wave plate and extending across a portion of the field of the instrument, may be cut in a manner similar to a Lippich prism to provide a half-shade device having a very fine line of separation between the two portions of the field. In this first construction a quartz plate with its optic axis substantially parallel to the azimuth of polarization of one of the two mutually perpendicular beams of polarized light may be used as the birefringent plate. I have also found that a similar plate of material which rotates the plane of polarization of polarized light incident thereon may be located immediately in front of the analyzer to produce a similar effect. In the second construction a quartz plate which has been cut from a crystal such that its optic axis is substantially parallel to the path of rays traveling through the plate may be used for the plate. Both of these constructions result in simple, rugged, and relatively inexpensive eyepieces, as will be described in greater detail hereinafter. By controlling the thickness of the quartz plates, the half-shade angle may be optimized, depending upon the extinction ratios of the class of instruments with which the eyepiece is to be used. Thus other birefringent or optically active materials may be used, these being generally referred to hereinafter as "anisotropic materials."

A first embodiment of the improved eyepiece made according to my invention is illustrated in Figure 3. As shown therein, the eyepiece generally indicated at 50 includes a quartz plate 52 which is the half-shade device, a quarter-wave plate 54, a field lens 56, an analyzer 58 similar to the analyzer 44 of Figure 1, and an eye lens generally indicated at 60. The quarter-wave plate 40 and analyzer 44 shown in Figure 1 are removed from the microscope when the eyepiece generally indicated at 50 is used, since the eyepiece itself includes these elements. The quarter-wave plate 54, field lens 56, analyzer 58, and eye lens 60 are of conventional design and perform their usual functions. The half-shade effect, with which this invention is concerned, is achieved by the use of the plate 52. This plate may be made of any material which is birefringent, such as quartz or calcite. I have found that quartz is a preferable material because of the ease with which it may be fabricated. For use in the embodiment of Figure 3, the axis of the birefringent material is preferably parallel to the azimuth of polarization of one of the two perpendicular components of polarized light falling thereon.

The two physically united but perpendicularly polarized light beams from the instrument are imaged by the objective 34 in the plane 62 in which the plate 52 is located. In the embodiment which I have illustrated, the plane of polarization in one-half of the field of view is to be shifted. Accordingly, the edge 52c of the plate 52 which extends perpendicularly to the plane of the drawing in Figure 3 is located in the image plane and intersects the optical axis. The image formed by the objective 34 in the image plane 62 below the edge 52c is unaffected by the half-shade device. However, one of the two components of light forming the image above the edge 52c in Figure 3 is retarded with respect to the other component in passing through the birefringent plate 52. When these two components are combined by the quarter-wave plate 54 into a single plane polarized beam, the azimuth of this single plane polarized beam will be different from that of the image formed in the lower half of the image plane.

In order to greatly reduce and almost eliminate the line of division between the two portions of the half-shade field, the configuration of the plate 52 is so chosen that the line of division between the two portions of the half-shade field is greatly reduced and in fact almost eliminated. To understand this configuration, reference should be had to Figure 4 which is an enlarged view of the area enclosed within the circle 4 of Figure 3.

For the line between the two portions of the field in a half-shade device to completely disappear, it is necessary that a point immediately adjacent to and on each side of the dividing line be illuminated by the full cone or bundle of rays which would illuminate it if the half-shade device were not present. The rays 64 represent the outermost rays of the bundle or cone of rays which form the image at the point $I_1$. The inner surface 52d of the half-shade plate 52 is inclined at an angle $\gamma$ with respect to the optical axis, this angle being at least sufficiently large so that the outermost rays 64 of the bundle forming the image $I_1$ are not interfered with by the plate. As shown in Figure 4, I have found in practice that it is preferable to make this angle somewhat greater than the minimum angle required.

In order to insure that the half-shaded image is also illuminated by a full bundle of rays, the surface 52a is inclined to the surface 52d at such an angle that a ray such as ray 66 striking the lower entrance edge 52e of plate 52 will be refracted by the plate to a point $I_2$ in the image plane immediately adjacent to the image of $I_1$. The outermost ray 67 of the cone of rays forming the image $I_1$ will also be refracted by the plate 52 as shown in Figure 4. Thus the image formed by the objective in the image plane 62 within the half-shade device is also illuminated by a full bundle of rays. Since both sides of the edge of the half-shade device are fully illuminated, the line between them tends to disappear.

The only light lost in the system, which would tend to give width to the dividing line between the two halves of the split field, is that which strikes the inclined surface 52d. It should be understood that Figures 3 and 4 have been exaggerated for purposes of clarity, and in practice the relative extent and slope of surface 52d is substantially less than that indicated. Thus the loss of light in the system is negligible. That small amount of light which does strike the surface 52d is either reflected from the surface and is eliminated from visual observation by a diaphragm, or it is refracted within the plate 52 and disappears out of the field of view. It should also be noted that the surface 52b is parallel to the surface 52a so that the rays forming the image at $I_2$ continue in their original directions after leaving the exit surface 52b. The thickness of the half-shade plate 52 determines the half-shade angle of the eyepiece; the factors which determine this thickness for optimum operation will be hereinafter described.

A second embodiment of a half-shade eyepiece made according to my invention is illustrated in Figure 5. As shown therein, the quartz plate 68 is located in this embodiment between the quarter-wave plate 54 and the analyzer 58 rather than in front of the quarter-wave plate as shown in Figure 3. The half-shade plate 68 is made of material which rotates the plane of polarization of polarized light falling thereon. Thus it may be made of quartz whose optic axis is parallel to the mean direction of the rays traversing the plate 68, as indicated by the arrow 69. The other considerations which determine the configuration of the half-shade plate in Figure 3 also determine the configuration of the plate 68 in the embodiment of Figure 5, i.e. the edge 68c lies in the image plane and intersects the optic axis of the instrument, and the surface 68d is inclined with respect to the optic axis so that a point lying in the image plane immediately adjacent the edge 68c will be illuminated by a full bundle of rays from the objective to the instrument. It is immaterial whether the quartz used for the plate 68 is right-handed or left-handed, since either one will produce a rotation of the azimuth of the plane polarized light incident on it for purposes of the half-shade device.

It will be apparent that the half-shade eyepiece of Figure 5 may be used with any instrument in which it is desired to measure changes in azimuth of polarization of polarized light. By omitting the quarter-wave plate 54, a single component of polarized light may be focused by the instrument objective in the image plane where the half-shade device is located. The half-shade eyepiece, including the half-shade plate 68 and the analyzer, will then function in the manner previously described to measure the mean azimuth of the two portions of the beam.

The desirability of optimizing the half-shade angle in devices of the type described can be pointed out by reference to the curves of Figure 6. In Figure 6a the apparent brightness of each half of the field of a half-shaded field is plotted as a function of analyzer setting for an instrument having a relatively high extinction ratio. As previously defined, the extinction ratio is the luminance of the field when the analyzer azimuth is parallel to the azimuth of polarization divided by the luminance when it is at right angles to the plane of polarization of the light illuminating the field. It should be noted that the curves of Figure 6 are for illustrative purposes only and are not intended to be quantitative, since the apparent brightness is a psychological quantity.

If the half-shade device covers half the field so that there are two portions, the brightness of each portion as a function of analyzer setting might be represented by the curves $A_1$ and $A_2$ in Figure 6a. Thus as the analyzer is rotated curve $A_1$, representing the brightness of one-half of the field, decreases to a minimum and rises again, and at the same time but at a slightly displaced analyzer azimuth the curve $A_2$ does the same. The minima of the two curves are separated by an angle $\delta_1$ which is the half-shade angle of the device. It will be noted that the two fields are matched, i.e. of equal intensity, at the point $M_a$ which is intermediate between the two minima. It will also be noted that the curves have a fairly steep slope at this point and that any movement of the analyzer from this location will substantially darken one portion of the field and cause a corresponding brightening of the other portion. Thus the half-shade angle $\delta_1$ is optimum or nearly so for the instrument of Figure 6a.

Figure 6b is a plot similar to Figure 6a except that in the instrument of Figure 6b the extinction ratio is substantially lower, i.e. the apparent brightness does not fall off very sharply and then rise very sharply in each half of the field, but the minima are somewhat broader. In the event that the same half-shade angle $\delta_1$ as used in Figure 6a was chosen for this second instrument, the corresponding curves to $A_1$ and $A_2$ would be the solid curve $B_1$ and the dashed curve $B_2$. In this case the minima of the two curves are again separated by the angle $\delta_1$. However, it will be observed that the match point $M_b$ in Figure 6 occurs at the crossing of the two curves having very shallow slopes; it would be quite difficult for an operator to establish this point by changes in the apparent brightness of the two fields. Thus the selection of the angle $\delta_1$ in this case results in a fairly insensitive device and a large opportunity for error. However, if an angle $\delta_2$ is selected which is substantially larger than the angle $\delta_1$, it will be noted that the curve $B_2'$ corresponding to this angle will be substantially shifted with respect to the curve $B_1$ and the slopes of the curve will both be substantial at the point where they cross $M_b'$. If the analyzer is moved slightly off the azimuth corresponding to $M_b'$, the change in the intensity of the two portions of the field will be quite apparent. This is in contrast to the situation when a small half-shade angle was used. From these figures it is apparent that where the extinction ratio is high, the half-shade angle for maximum sensitivity should be relatively small, while when the extinction ratio is lower, the half-shade angle should be increased to obtain maximum sensitivity and accuracy.

I have found that it is possible to obtain a relationship between the optimum half-shade angle and the extinction ratio if it is assumed that Weber's law is valid, i.e. that:

(1) $$\frac{\Delta I}{I} = C$$

Equation 1 states that the minimum change in luminance, herein referred to as brightness, which is discernible by the eye, $\Delta I$, divided by the brightness $I$ is equal to a constant. It is also assumed that the brightness varies in accordance with the following equation:

(2) $$I = A + B \sin^2 \theta$$

where $\theta$ is the angle of the analyzer setting and $A$ and $B$ are constants depending upon the instrument. When the two fields are matched, the brightness of the two sides $I$ and $I'$, respectively, will be equal:

(3) $$I = I'$$

and the analyzer setting $\theta$ at match will be equal to $\bar{\theta}$. Substituting in Equation 2:

(4) $$A + B \sin^2 \bar{\theta} = A + B \sin^2 (\bar{\theta} + \delta)$$

Solving for $\delta$ in terms of $\bar{\theta}$ we obtain:

(5) $$\bar{\theta} = \pm(\bar{\theta} + \delta)$$

One solution of Equation 5 is:

(6) $$\delta = -2\bar{\theta}$$

If the analyzer is turned by the minimum angle from the match condition, $\Delta\theta_m$, which just gives a discernible difference in brightness between the two fields, then the brightness of one field will be given by:

(7) $$I = A + B \sin^2 (\Delta\theta_m - \delta/2)$$

and that of the other half of the field by:

(8) $$I' = A + B \sin^2(\Delta\theta_m + \delta/2)$$

The minimum difference in brightness that can be seen, $\Delta I$, is the difference between the brightness defined in Equations 7 and 8 and is equal to:

(9) $$\Delta I = I - I'$$
$$= B[\sin^2(\Delta\theta_m - \delta/2) - \sin^2(\Delta\theta_m + \delta/2)]$$
$$= B \sin \delta \sin^2 \Delta\theta_m$$

The brightness at this point, it will be recalled, is equal to:

(10) $$I = A + B \sin^2 (-\delta/2)$$
$$= A + B/2 - B/2 \cos \delta$$

Substituting Equations 9 and 10 in Weber's law (Equation 1) gives:

(11) $$\frac{\Delta I}{I} = C = \frac{B \sin \delta \sin^2 \Delta\theta_m}{A + B/2 - B/2 \cos \delta}$$

Equation 11 may be rewritten as follows:

(12) $$B \sin \delta \sin^2 \Delta\theta_m = C(A + B/2 - B/2 \cos \delta)$$

or

(13) $$\sin^2 \Delta\theta_m = C \frac{[A + B/2 - B/2 \cos \delta]}{B \sin \delta}$$

Since $\Delta\theta_m$ will be a small angle, and for small angles the sine of the angle is equal to the angle itself, the right-hand portion of Equation 13 may be differentiated with respect to $\delta$, equated to zero, and solved for $\delta$. This will be the optimum value of $\delta$, i.e. that value which requires the smallest analyzer departure from the match condition to produce a just noticeable difference in brightness. This is also the position of maximum sensitivity. Differentiating Equation 13:

(14) $$\frac{d(\sin^2 \Delta\theta_m)}{d\delta} = \frac{C}{2 \sin^2 \delta_{opt.}} \left[1 - \left(\frac{2A}{B} + 1\right) \cos \delta_{opt.}\right]$$

Setting the right-hand portion of Equation 14 equal to zero and solving for $\delta$, I obtain:

(15) $$\cos \delta_{opt.} = \frac{1}{\frac{2A}{B} + 1}$$

or

(16) $$\delta_{opt.} = \cos^{-1} \frac{B}{2A + B}$$

If the extinction ratio $E$ is defined by the following equation:

(17) $$E = \frac{A + B}{A}$$

then $\delta_{opt.}$ is given by:

(18) $$\delta_{opt.} = \cos^{-1} \frac{E - 1}{E + 1}$$

Equation 18 defines the half-shade angle which produces the smallest $\Delta\theta_m$ and therefore the maximum instrument sensitivity in terms of the extinction ratio of the instrument.

In Figure 7 there is shown a plot of the sensitivity of instruments of the type shown in Figure 1 plotted as a function of the half-shade angle for various extinction ratios. When the extinction ratio is relatively high, i.e. approximately 35, the optimum half-shade angle is quite clearly seen to be approximately 20°. The calculated angle from Equation 18 is approximately 19.2°. For an extinction ratio of 20, the graph shows a maximum in the neighborhood of 25° and the calculated optimum angle from Equation 18 is 25.2°. Similarly, for an extinction ratio of 10, Equation 18 gives an optimum half-shade angle of 35.1°.

The extinction ratio in an instrument varies with the magnification of the system in use. Thus in the curves of Figure 7 the curve for an extinction ratio of 10 is for a 10× shearing system. That for which E equals 20 is for a 40× shearing system, and that in which E equals 35 is for a 100× shearing system. If the optimum half-shade angle is selected for the higher power system, i.e. the system in which the extinction ratio is 35, it will be observed from the curves of Figure 7 that it has relatively little effect upon systems having lower extinction ratios because of the broad maxima of these curves. Thus if 20° is selected for the half-shade angle, this value intersects the curve for an extinction ratio of 20 at approximately 97 percent of its maximum value and the curve for an extinction ratio of 10 at approximately 85 percent of its maximum value. Since the highest power is generally used for the most critical work in this class of instruments, the optimum half-shade angle for an extinction ratio of 35 would be selected.

Once the optimum half-shade angle is selected for a particular instrument, it remains to construct a half-shade device such as the plate 52 of Figure 3 or the plate 68 of Figure 5 such that this optimum half-shade angle is realized. In practice, it has been found that a plate of the proper thickness can be obtained most easily by cutting a plate to approximate thickness and measuring the half-shade angle obtained. The plate is then gradually ground to obtain the desired half-shade angle. While the optimum thickness of the plate may be calculated, this calculation is somewhat complicated by the fact that the light is not striking the plate perpendicularly in either of the half-shade eyepieces herein described. Thus the cut-and-try method described is more likely to be useful. It should also be noted that the plate 52 of Figure 3 should introduce a phase shift between the two components of polarized light falling thereon of twice the half-shade angle desired, since in passing through the quarter-wave plate the azimuth shift will be half the difference in phase of the two components falling thereon. The rotation of the plane of polarization by the plate 68 of Figure 5 should be equal to the desired half-shade angle.

In practice it is not possible to make the plate 52 sufficiently thin so that they produce the exact half-shade angle desired. Rather, the thickness of the plates is chosen or selected so that the angle of rotation or the angle of phase shift, as the case may be, is $$n(360°) + 2\delta_{opt}$$

Thus, in an eyepiece of the type illustrated in Figure 3 in which quartz was used for the half-shade plate and a half-shade angle of 20° was desired, the plate thickness was approximately 0.007″. This caused a relative phase shift in the two components incident on the plate of 3×360°+40°. It is apparent that while the optimization of the half-shade angle has been described with reference to the half-shade eyepieces of my invention, these same considerations would apply to prior half-shade devices having substantially greater line widths.

Thus I have provided two embodiments of an improved half-shade device for use with optical instruments using polarized light, in both of which the line width separating the two portions of the field of view is substantially minimized. These devices are relatively simple but rugged in construction and can be readily manufactured as a simple complete unit. I have also provided half-shade devices in which the half-shade angles may be optimized for the extinction ratios of the class of instruments with which the device is to be used, thus providing increased sensitivity and accuracy of measurement. In utilizing a half-shade device of the type shown in Figure 3 on a 100× microscope system of the type shown in Figure 1 where the half-shade angle had been optimized, it was found that the uncertainty in measurement corresponded to an optical path difference of only 6 angstroms. This is of the same order of magnitude as the uncertainty obtained with the complex and delicate ground glass-high speed relay device previously described and indicates the accuracy of measurement possible with the simple devices made according to my invention.

It will thus be seen that the objects set forth above, among those made apparent from the preceding description, are efficiently attained and that certain changes may be made in the above constructions without departing from the scope of the invention. It is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In a device for use with a class of optical instruments utilizing polarized light, means for changing the azimuth of the polarized light from one portion of the field of said device with respect to another portion by an angle $\delta$, said means comprising a non-polarizing transparent plate of anisotropic material positioned such that the image plane of said instrument objective is included therein and such that said light from the portion of said field whose azimuth is to be shifted passes therethrough, a first corner of said plate formed by the exit surface thereof and the edge of said plate adjacent the optical axis of said instrument defining the line of separation between two portions of said field, said edge being inclined with respect to said optical axis at an angle at least sufficient to permit the image formed immediately adjacent said first corner, but outside said plate, to be illuminated by a full cone of rays from said objective, the entrance surface of said plate being inclined to said inner edge at an angle such that light striking said entrance surface at a second corner defined by said entrance surface and said inner edge is refracted by said plate to form an image immediately adjacent said first corner within said plate, said entrance and exit surfaces being substantially parallel, and a polarizing analyzer for measurement of the azimuth angle of said light, said angle $\delta$ being substantially defined by the relationship:

$$\delta = \cos^{-1}\frac{E-1}{E+1}$$

where E is the extinction ratio of the instrument having the highest extinction ratio of the class of instruments with which said device is to be used.

2. The combination defined in claim 1 in which said anisotropic material is quartz.

3. In a device for use with an optical instrument utilizing polarized light, means for changing the azimuth of the polarized light from one portion of the field of said device with respect to another portion by an angle $\delta$, said means comprising a non-polarizing transparent plate of anisotropic material positioned such that the image plane of said instrument objective is included therein and such that said light from the portion of said field whose azimuth is to be shifted passes therethrough, a first corner of said plate formed by the exit surface thereof and the edge of said plate adjacent the optical axis of said instrument defining the line of separation between two portions of said field, said edge being inclined with respect to said optical axis at an angle at least sufficient to permit the image formed immediately adjacent said first corner, but outside said plate, to be illuminated by a full cone of rays from said objective, the entrance surface of said plate being inclined to said inner edge at an angle such that light striking said entrance surface at a second corner defined by said entrance surface and said inner edge is refracted by said plate to form an image immediately adjacent said first corner within said plate, said entrance and exit surfaces being substantially parallel, and a polarizing analyzer for measurement of the azimuth angle of said light, said angle $\delta$ being substantially defined by the relationship:

$$\delta = \cos^{-1}\frac{E-1}{E+1}$$

where E is the extinction ratio of said instrument.

4. The combination defined in claim 3 in which said anisotropic material is quartz.

5. In a device for use with optical instruments utilizing polarized light, means for changing the azimuth of the polarized light from one portion of the image field of said device with respect to another portion, said means comprising a non-polarizing light transparent plate of anisotropic material positioned such that the image of said instrument objective is included therein and such that said light from the portion of said field whose azimuth is to be shifted passes therethrough, a first corner of said plate formed by the exit surface thereof and the edge of said plate adjacent the optical axis of said instrument defining the line of separation between two portions of said image field, said edge being inclined with respect to said optical axis at an angle at least sufficient to permit the image formed immediately adjacent said first corner, but outside said plate, to be illuminated by a full cone of rays from said objective, the entrance surface of said plate being inclined to said inner edge at an angle such that light striking said entrance surface near a second corner defined by said entrance surface and said inner edge is refracted by said plate to form an image immediately adjacent said first corner within said plate, said entrance and exit surfaces being substantially parallel.

6. The combination defined in claim 5 in which said anisotropic material is quartz.

7. In a half-shade eyepiece for a class of optical instruments utilizing polarized light, means for changing the azimuth of the polarized light from one portion of the field of said eyepiece with respect to another portion by an angle $\delta$, and a polarizing analyzer for measurement of the azimuth angle of said light, said angle $\delta$ being substantially defined by the relationship:

$$\delta = \cos^{-1}\frac{E-1}{E+1}$$

where E is the extinction ratio of the instrument having the highest extinction ratio of the class of instruments with which said eyepiece is to be used.

8. A half-shade device for optical instruments utilizing polarized light having two components polarized perpendicularly to each other comprising, in combination and in order of location along the optical axis of said instrument in the direction of light transmission, a half-shade plate of birefringent material, said half-shade plate being positioned such that the image plane of said instrument objective lies therein and such that light from a portion of the field of view of said eyepiece passes therethrough, the optical axis of said plate being substantially parallel to the azimuth of polarization of one of said perpendicularly polarized components, a first corner of said plate formed by the exit surface thereof and the edge of said plate adjacent the optical axis of said instrument defining a line of separation between two portions of said field of view, said corner lying in the image plane of said instrument objective, said edge being inclined with respect to said optic axis at an angle at least sufficient to permit the image formed immediately adjacent said first corner, but outside said plate, to be illuminated by a full cone of rays from said objective, the entrance surface of said plate being inclined to said inner edge at an angle such that light striking said entrance surface near a second corner defined by said entrance surface and said inner edge is refracted by said plate to form an image immediately adjacent said first corner within said plate, said entrance and exit surfaces of said plate being substantially parallel, a quarter-wave plate positioned behind said half-shade plate, an analyzer for determining the azimuth of polarization of the polarized light incident thereon, and an eye lens.

9. The combination defined in claim 8 in which the birefringent material of said plate is quartz, the surfaces of said plate being parallel to the optic axis of the quartz crystal from which said plate was fabricated.

10. The combination defined in claim 8 in which the thickness of said half-shade plate is selected so that the angle $\delta$ through which the analyzer must be rotated to change from minimum luminance in the unshaded portion of the field to minimum luminance in the shaded portion thereof is defined by the relationship:

$$\delta = \cos^{-1}\frac{E-1}{E+1}$$

where E is the extinction ratio of the instrument having the highest extinction ratio of the instruments with which said eyepiece is to be used.

11. A half-shade device for optical instruments utilizing polarized light comprising, in combination and in order of location along the optical axis of said instrument in the direction of light transmission, a half-shade plate of material adapted to rotate the plane of polarization of plane polarized light incident thereon, said half-shade plate being positioned such that the image plane of said instrument objective lies therein and such that light from a portion of the field of view of said eyepiece passes therethrough, a first corner of said plate formed by the exit surface thereof and the edge of said plate adjacent the optical axis of said instrument defining a line of separation between two portions of said field of view, said corner lying in the image plane of said instrument objective, said edge being inclined with respect to said optical axis at an angle at least sufficient to permit the image formed immediately adjacent said first corner, but outside said plate, to be illuminated by a full cone of rays from said objective, the entrance surface of said plate being inclined to said inner edge at an angle such that light striking said entrance surface at a second corner defined by said entrance surface and said inner edge is refracted by said plate to form an image immediately adjacent said first corner within said plate, said entrance and exit surfaces of said plate being substantially parallel, an analyzer for determining the azimuth of polarization of polarized light incident thereon, and an eye lens.

12. The combination defined in claim 11 which includes a quarter-wave plate located in front of said half-shade plate, whereby said eyepiece may be used with instruments utilizing two perpendicularly polarized light beams.

13. The combination defined in claim 11 in which said half-shade plate is quartz, the optic axis of said plate being parallel to the mean direction of the rays traversing the plate.

14. The combination defined in claim 11 in which the thickness of said half-shade plate is selected so that the angle $\delta$ through which the analyzer must be rotated to change from minimum luminance in one portion of the field to minimum luminance in the other portion thereof is defined by the relationship:

$$\delta = \cos^{-1}\frac{E-1}{E+1}$$

where E is the extinction ratio of the instrument having the highest extinction ratio of the instruments with which said eyepiece is to be used.

15. In a half-shade eyepiece for use with optical instruments utilizing polarized light, means for shifting the azimuth of polarization of light from one portion of the field of said eyepiece with respect to another portion, by an angle $\delta$, and a rotatable polarizing analyzer for measurement of the azimuth angles of said light, said angle $\delta$ being substantially defined by the relationship:

$$\delta = \cos^{-1}\frac{E-1}{E+1}$$

where E is the extinction ratio of the instrument with which said eyepiece is used.

No references cited.

UNITED STATES PATENT OFFICE
Certificate of Correction

Patent No. 2,880,648             April 7, 1959

Charles J. Koester

It is hereby certified that error appears in the printed specification of the above numbered patent requiring correction and that the said Letters Patent should read as corrected below.

Column 1, line 37, for "separatively" read —separately—; column 2, line 29, for "As example" read —An example—; column 6, line 13, for "half shade" read—half-shade—; column 10, line 10, for "$\bar{\delta}$" read —$\delta$—; lines 26, 35, 39, and 42, for "$\sin^2 \Delta\theta_m$", each occurrence, read —$\sin 2\Delta\theta_m$—; same column 10, line 55, for $$\frac{d (\sin^2 \Delta\theta_m)}{d} \text{ read } \frac{d (\sin 2\Delta\theta_m)}{d\delta}$$

column 11, line 65, for "$n(360°)+$" read —$n(360°)\pm$—.

Signed and sealed this 8th day of September 1959.

[SEAL]

Attest:
KARL H. AXLINE,
*Attesting Officer.*

ROBERT C. WATSON,
*Commissioner of Patents.*